US009864559B2

(12) United States Patent
Sizelove (10) Patent No.: US 9,864,559 B2
(45) Date of Patent: Jan. 9, 2018

(54) VIRTUAL WINDOW DISPLAY SYSTEM

(71) Applicant: Panasonic Avionics Corporation, Lake Forest, CA (US)

(72) Inventor: Steven Sizelove, Woodinville, WA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 28 days.

(21) Appl. No.: 15/084,365

(22) Filed: Mar. 29, 2016

(65) Prior Publication Data

US 2017/0286037 A1    Oct. 5, 2017

(51) Int. Cl.
*G06T 19/00*  (2011.01)
*H04N 21/414*  (2011.01)
*B64D 11/00*  (2006.01)
*G06F 3/14*  (2006.01)
*H04W 84/12*  (2009.01)
*H04B 7/185*  (2006.01)
*H04W 12/08*  (2009.01)

(52) U.S. Cl.
CPC ............ *G06F 3/14* (2013.01); *B64D 11/0015* (2013.01); *B64D 2011/0061* (2013.01); *H04B 7/18508* (2013.01); *H04W 12/08* (2013.01); *H04W 84/12* (2013.01)

(58) Field of Classification Search
CPC ......... G06T 11/60; G06T 11/00; G06T 19/00; G09G 5/14; G09G 2340/10; G09G 2340/125; B64D 2011/0061; B64D 11/00; B64D 11/0015; H04N 7/181; H04N 5/23238; H04N 5/23293; H04N 21/41422

USPC .................. 345/619, 629, 418, 632, 633
See application file for complete search history.

(56) References Cited

U.S. PATENT DOCUMENTS

| 8,855,798 B2* | 10/2014 | DiMaria ........... G06F 17/30038 345/440 |
| 2009/0027399 A1* | 1/2009 | Sato ..................... G01C 21/26 345/467 |
| 2009/0195652 A1* | 8/2009 | Gal ......................... B60R 1/00 348/148 |
| 2013/0038631 A1 | 2/2013 | DeMers et al. |
| 2013/0066526 A1* | 3/2013 | Mondragon ............ G09G 5/00 701/48 |
| 2013/0169807 A1 | 7/2013 | de Carvalho et al. |
| 2014/0173669 A1* | 6/2014 | Coto-Lopez ..... H04N 21/41422 725/76 |
| 2015/0077337 A1* | 3/2015 | Coto-Lopez ....... B64D 11/0015 345/156 |

(Continued)

FOREIGN PATENT DOCUMENTS

CN          101732873          12/2014

*Primary Examiner* — Chante Harrison
(74) *Attorney, Agent, or Firm* — Stetina Brunda Garred & Brucker (57) ABSTRACT

A method and system are provided for generating imagery of a virtual window within an aircraft cabin. The method may be implemented using computer executable instructions, loaded onto a personal entertainment device (PED) for configuring the PED to link to an aircraft inflight entertainment system (IFE) and access imagery, such as imagery from at least one camera directed to an environment outside of the aircraft. The imagery is displayed on a surface visible to the passenger, and formatted to simulate an aircraft window.

20 Claims, 7 Drawing Sheets

(56) References Cited

U.S. PATENT DOCUMENTS

2016/0381412 A1* 12/2016 Couleaud ........... H04N 21/4316
                                                    725/46
2017/0129607 A1*  5/2017 Grant ................. B64D 11/0015
2017/0136842 A1*  5/2017 Anderson ............ B60G 17/016
2017/0280124 A1*  9/2017 Ahlborn ............. H04N 13/0014

* cited by examiner

VIRTUAL WINDOW DISPLAY SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure is generally directed to the provision of imagery to a flight passenger in a specific manner, such as to improve the passenger's flight experience. For this purpose, a display system is provided wherein the display is implemented in such a way as to simulate an environment outside of the aircraft, such as a view from an aircraft cabin window.

2. Related Art

In the early days of flight, passengers were fascinated by the fact that they were travelling through the air and frequently passed the flight time observing the earth through the cabin windows from a bird's perspective. Today's airlines generally use larger planes in which fewer seats are positioned to allow passengers to have a clear view out of an aircraft window. Moreover, today's air travel journeys typically extend over distances that at the very least take several hours to complete. Some of the longer non-stop international flights have scheduled durations of over sixteen hours with travel distances extending beyond ten thousand miles. During such flights passengers on board the aircraft may be confined within an enclosed space of a designated seat for the entire duration of the flight, with only a few limited opportunities to leave the seat for use of the lavatory and so forth.

Present day passengers are invited to view entertainment on a conventional in-flight entertainment (IFE) system. In modern passenger aircraft, large IFE displays are commonly arranged above the passenger seats, or on a rear side of each passenger seat, in order to show individually selected entertainment programs to passengers. Contemporary on-board IFE systems offer a wide variety of multimedia content for passenger enjoyment. Recently released movies are a popular viewing choice, as are other films, news programs, situation and stand-up comedies, documentaries, and so on. Useful information about the destination such as airport disembarking procedures, immigration and custom procedures and the like are also frequently presented on IFE systems. Audio-only programming may also be available, typically comprised of playlists of songs fitting into a common theme or genre and/or audio-on-demand selections. Likewise, video-only content such as flight progress mapping, flight status displays, and so forth are available. Many in-flight entertainment systems also include video games that may be played by the passenger. Such programming is typically provided by an on-board IFE content server, in response to passenger input from a touchscreen or other user interface.

As entertaining as the content provided on the contemporary IFE systems may be, they may not invoke the spacious or restfulness view of the sky and/or ground below compared to an aircraft window view. It would be desirable to also give passengers, wherever located, the ability to at least appear to be able to look out of a "picture window" and provide a panoramic cockpit view of the horizon, the sky above and/or the ground below. Such additional functionality would be particularly desirable where a window view is not readily accessible from the user's seat. For instance, ultra-premium cabin configurations offer "suites" without windows, while a substantial segment of passengers in other cabin classes, particularly in large, long-haul aircraft, are seated within the aisle without access to a window view. Furthermore, there are flights at all hours, and the view outside the aircraft may be completely dark. The sense of spaciousness and restfulness that may result from such a window view would provide a greater sense of luxury for most passengers and tend to offset any anxiety or similar feelings that may arise from being confined to small seats in a crowded main cabin, especially for long flights.

The creation of such environment may be accomplished through a "virtual window," which may be projected onto an adjacent aircraft interior surface or on a custom sidewall display, displayed on a PED display surface or displayed on a IFE display surface. According to a non-limiting embodiment of the present invention, the displayed imagery can substantially simulate a live view of an aircraft wing, or ground terrain that the aircraft is currently passing over. Thus, passengers looking at the surface where the imagery is displayed are led to believe that a simulated window exists at that location in the aircraft as they see images that are substantially consistent with what they would see if an actual window were present at the same location. The passenger thus has the illusion of looking through a real panoramic window in the aircraft fuselage. That illusion may enhance the passenger experience by providing a spacious and serene view that tends to mitigate any anxiety that passengers may experience during flight and/or provides a more relaxing passenger environment.

An increasing number of passengers are choosing to bring aboard their own portable electronic devices (PEDs) such as smart phones, media players, electronic readers, tablets, laptop computers, and so forth. In some IFE implementations, a PED can connect to an on-board WiFi network, to access content stored on an on board content server, or to access a satellite based link to a worldwide network, where other content is available. To further enhance and personalize the passenger experience it would be preferable to allow a PED to select and/or edit imagery that appears in the virtual window.

It would further be preferable if imagery could be selected, or edited by the PED, to compliment, or otherwise respond to a sensed biological condition or mood of the passenger. Selection and/or editing could be implemented in a manner to mitigate discomfort and enhance the passenger flight experience. Sensing functions, as well as the selection and editing of imagery displayed within the virtual window may preferably be implemented independent of any processing resources of the onboard content server, other than those necessary to interface the PED with onboard content, such as imagery from the externally mounted cameras, or to interface on-board communication resources useful to access resources on the worldwide information network, such as Google Earth™ and other resources. The IFE might also preferably function to connect the PED with an IFE display, such as a display screen disposed on a seatback or other structure, to allow the selected imagery to be displayed on that display, instead of or in addition to being shown on a PED display. Utilizing PED functionality to implement and direct the selection, editing and display of selected imagery would mitigate the demands on the IFE to generate passenger specific imagery, and allow such additional functionality to be implemented without the need to continually reprogram the IFE content server. This enhances the functionality of the IFE system, by association with the PED, as more fully described below.

BRIEF SUMMARY

A method and system are provided for generating imagery of a virtual window within an aircraft cabin. The method may be implemented using computer executable instructions, loaded onto a personal entertainment device (PED) for configuring the PED to link to an aircraft inflight entertainment system (IFE) and access imagery, such as imagery from at least one camera directed to an environment outside of the aircraft. The imagery may be displayed on a surface visible to the passenger, and formatted to simulate an aircraft window.

The PED may be configured for wireless communication with an IFE system, to access live imagery of the environment outside the aircraft, or to access an internet communicable device associated with the IFE. The imagery may be edited in response to sensed passenger mood information and/or passenger profile information on a passenger monitoring system that detects information indicative of the current mood or other condition of the passenger. The environment monitoring may detect information such as aircraft position, lighting, noise level, vibration, etc. Passenger profile information may be indicative of the age, interests or profession of the passenger or the purpose or duration of the trip, the frequent flyer status of the passenger and other personal or professional circumstances. Passenger monitoring information, environment monitoring information add/or passenger profile information may be used to select and/or edit a display presented to the passenger in the virtual window.

The edited imagery may be displayed on the PED, on IFE display, or projected onto a surface disposed proximate the passenger, such as an adjacent bulk head, ceiling, or other structure. The edited image may include a frame, substantially circumscribing the edited image, where the frame is made to be representative of an aircraft window frame. Image editing may include modifying at least one of image brightness and image coloring.

The PED may also be configured to selectively access audio data from one of the IFE and/or a third party website accessible by the internet communicable device. The accessed audio data may similarly be edited in response to sensed mood information, in response to environmental information and/or in response to the passenger profile information. The edited audio data may be communicated to the passenger along with the edited imagery or independent of any imagery. The audio data editing may include editing of volume associate with audio data.

The PED may further be configured for generating location information, using resources within the PED, or otherwise available on the IFE. The PED may access terrain information, corresponding to the location information, from a third party website accessible through the IFE Internet communicable device. The accessed geographical feature information may be displayed in the virtual window.

The invention may further include an image projector, in communication with the PED, for communicating the edited image onto an aircraft interior surface proximate the passenger.

The step of linking the PED to the IFE may be implemented by polling the IFE, using a series of communication protocols, to identify a specific communication protocol used by the IFE. Once a specific communication protocol is identified, the identification of the specific IFE system and/or the configuration requirements for the specific IFE system, may be determined to facilitate communication between the PED and the IFE and the resources associated with the IFE.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a system for dynamically implementing a virtual window on an aircraft. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
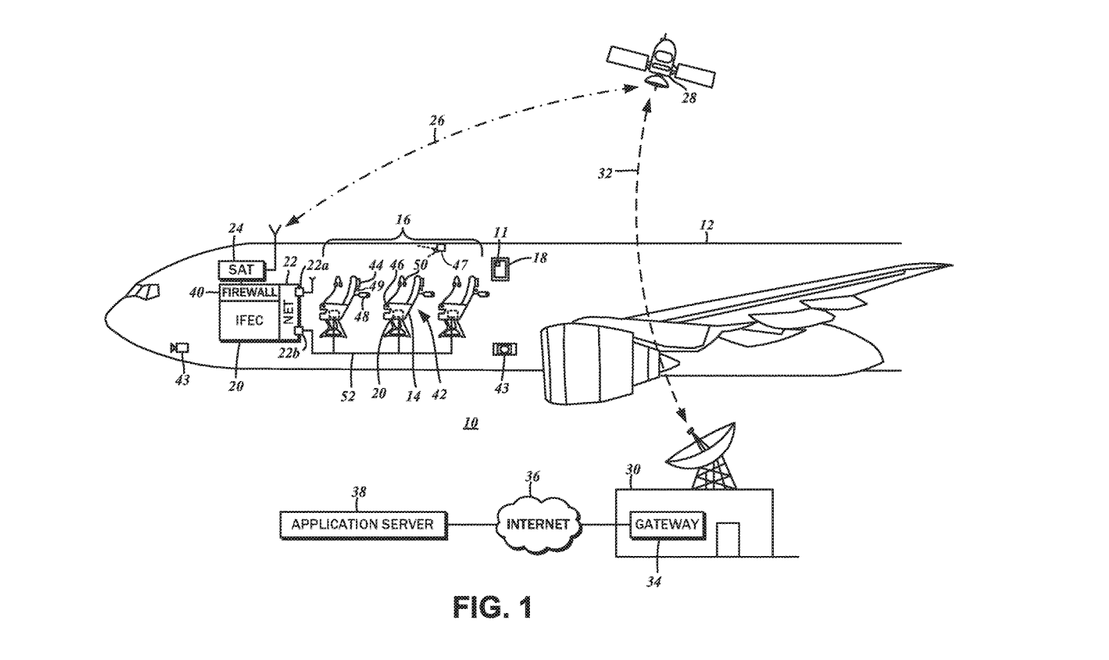
FIG. 1 is a diagram illustrating an environment in which the present system and method for generating a virtual window display may be employed, in accordance with various embodiments.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there may be seats 14 arranged over multiple rows 16, with the seats 14 designed for accommodating passengers.

One or more passengers may utilize a portable electronic device (PED) 18 during flight. The present disclosure generally contemplates, in accordance with one embodiment, the use of such PEDs 18 in a manner to which the user is accustomed while on the ground, e.g., with data connectivity. For purposes of the present disclosure, PEDs 18 refer to smart phones, tablet computers, laptop computers, and other like devices that include a general purpose data processor or processor(s) that executes instructions, e.g., programs and applications, to generate various outputs on a display in which inputs control the execution of the instructions. Although these devices are most often brought on board the aircraft 10 by the passengers themselves, carriers may also offer them to the passengers for temporary use.

The aircraft 10 incorporates a conventional in-flight entertainment and communications (IFE) system 20 that, among other functions, provides such connectivity. In further detail, the IFE system 20 includes a data communications module 22. Since most conventional PEDs 18 have a WLAN (WiFi) module, the data communications module 22 of the IFE system 20 includes a WLAN access point 22a to provide a convenient way for communication between a PED 18 and the IFE system 20. In particular, a PED 18 via the onboard WLAN network, may connect to the IFE system 20 to access various services offered thereon such as content downloading/viewing, shopping, and so forth.

The IFE system 20 may also offer Internet access to the connecting PEDs 18. One contemplated modality that operates with the IFE system 20 is a satellite module 24 that establishes a data uplink 26 to a communications satellite 28. According to one exemplary embodiment, the data uplink 26 may be Ku-band microwave transmissions. However, any suitable communications satellite 28, such as Inmarsat or Iridium may also be utilized without departing from the present disclosure, including other transmission bands, such as Ka-band. The data transmitted to the communications satellite 28 is relayed to a satellite communications service provider 30. A data downlink 32 is established between the communications satellite 28 and the satellite communications service provider 30 that, in turn, includes a network gateway 34 with a connection to the Internet 36. As will be recognized by those having ordinary skill in the art, there are numerous servers that are accessible via the Internet 36, though in the various embodiments of the present disclosure, the PED 18 connects to a particular application server 38 to access services thereon.

Accordingly the PED 18 may wirelessly connect to the IFE system 20 via the WLAN access point 22a, which relays the data transmissions to the satellite module 24. The data is transmitted to the communications satellite 28 over the data uplink 26, and the satellite relays the data to the satellite communications service provider 30 over the data downlink 32. The network gateway 34 then routes the transmission to the Internet 36, and eventually to a remote application server 38. Data transmissions from the application server 38 to the PED 18 are understood to follow a reverse course.

A firewall 40 may selectively block or permit specific devices connecting thereto via the onboard local area network from accessing the upstream network connection, e.g., the satellite module 24 depending on certain administratively defined conditions. For example, a rule/exception may be set for allowing traffic between a particular PED 18 that has paid a subscription fee, if necessary, to load an application program in accordance with the present invention, while restricting other PEDs 18 that have not subscribed. Those having ordinary skill in the art will recognize that numerous other rules/exceptions for upstream data traffic may be set by defining such rules/exceptions in accordance with the syntax specific to the firewall 40. In this regard, although the syntax may differ depending on the specific implementation of the firewall 40, the logic of the rules/exceptions are understood to be applicable regardless of implementation. Therefore, to the extent such rules/exceptions are described in accordance with syntax specific to a given firewall 40, it is to be understood that this is by way of example only and not of limitation.

The display 44 is understood to be a conventional liquid crystal display (LCD) screen or other type with a low profile that is suitable for installation on the seatback. Each passenger can utilize an individual headset 50, supplied by either the airline or by the passenger, which provides a more private listening experience. In the illustrated embodiment, the IFE audio output 46 is a headphone jack that is a standard ring/tip/sleeve socket. The headphone jack may be disposed in proximity to the IFE seatback display 44 or on the armrest of the seat 14. The headphone jack may be an active type with noise canceling and including two or three sockets or a standard audio output without noise canceling. In alternate embodiments, each display 44 may incorporate a terminal unit 42 to form a display unit referred to in the art as a smart monitor.

A common use for the terminal unit 42 installed on the aircraft is the playback of various multimedia content. The terminal unit 42 may be implemented with a general-purpose data processor that decodes the data files corresponding to the multimedia content and generates video and audio signals for the display 44 and the IFE audio output 46, respectively. It is also possible for the user to interact with the multimedia content being presented on the display 44 and the IFE audio output 46 with a remote controller 48. The multimedia content data files may be stored in one or more repositories associated with the IFE system 20, and each of the terminal units 42 for each seat 14 may be connected thereto over a wired local area network 52, which may preferably be Ethernet. In addition to the aforementioned data communications module 22 that includes the access point for PEDs 18, there is an Ethernet data communications module 22b. More particularly, the Ethernet data communications module 22b is understood to be an Ethernet switch or a router.

In accordance with the present invention, the PED 18 augments, and in some cases substitutes for the functionality of the IFE system 20, to facilitate the generation of a virtual window on a display surface within the interior of the aircraft 12. As described in more detail below, the display surface may be the PED display, the IFE seatback display 44 and/or a display projected to appear on an interior surface of the aircraft 12. Further in accordance with the present invention, the PED may facilitate the generation of the virtual window using a combination of resources, including resources within the PED 18, IFE resources, and remote resources accessible through an internet communicable device disposed on the aircraft, such as satellite module 24. As also further described below, the PED 18 may select and/or edit content received from various sources in accordance with information such as passenger profile information, sensed passenger activity information, sensed passenger mood information, sensed environmental conditions, and other factors.

Under anticipated usage scenarios, the PED 18 may initiate a request to enable a pathway that allows it to access and display the accessed imagery. For example, PED 18 may enable a pathway to display imagery such as live imagery from a camera 43 disposed on the aircraft exterior surface on a PED display, on a remote display device such as the IFE seatback display 44, and/or an IFE projection unit 47. As will be recognized by those having ordinary skill in the art, the camera 43 may be oriented in one or more directions, including forward facing, side facing, rear facing, and so on to capture a panoramic view of the landscape and/or sky around the aircraft. Although in most implementations the camera 43 has a static orientation, there may be other embodiments in which the orientation may be adjusted. The PED 18 may also enable a pathway to an internet communicable device such as a satellite module 24 to access imagery available on the Internet 36. Access to the satellite module 24 may be enabled so long as permission has been granted therefor by the firewall 40 in the same manner as in relation to the WLAN network, with a request originating from the PED, on which an enabling application program has been loaded.

The present invention may be implemented as an application, loaded on the PED 18, which allows the PED to interface with the various IFEs, and access content available to the IFE, using appropriate protocols and authorizations as may be used or required by various aircraft and airlines. It is anticipated that the application, when launched, will be able to autonomously establish a communications link with the IFE system 20 and access resources suitable to present imagery of a virtual window for observation by the passenger. In a default condition, the application may access live imagery from one or more cameras 43 directed towards an exterior surface of an aircraft, or some other environment outside of the aircraft such as the terrain below. Where such imagery is not available, either because the particular aircraft does not support such cameras, or because external environmental conditions do not allow presentation of an appropriate view, e.g., when it is dark and cloudy, the PED 18 may default to accessing such terrain information associated with the location of the aircraft from websites including Google Earth™. At night time, the PED may default to presentation of a night's sky imagery, associated with the then current location of the aircraft. Such imagery can also be obtained from cameras directed to an area above the aircraft, or from a third party websites, such as Google Sky™ or Earth Sky™. The selected imagery may be live, prerecorded and/or simulated the imagery may also be edited to be framed in a manner to simulate a view through an aircraft window when presented on a suitable display surface viewable by the passenger.

Figure 2:
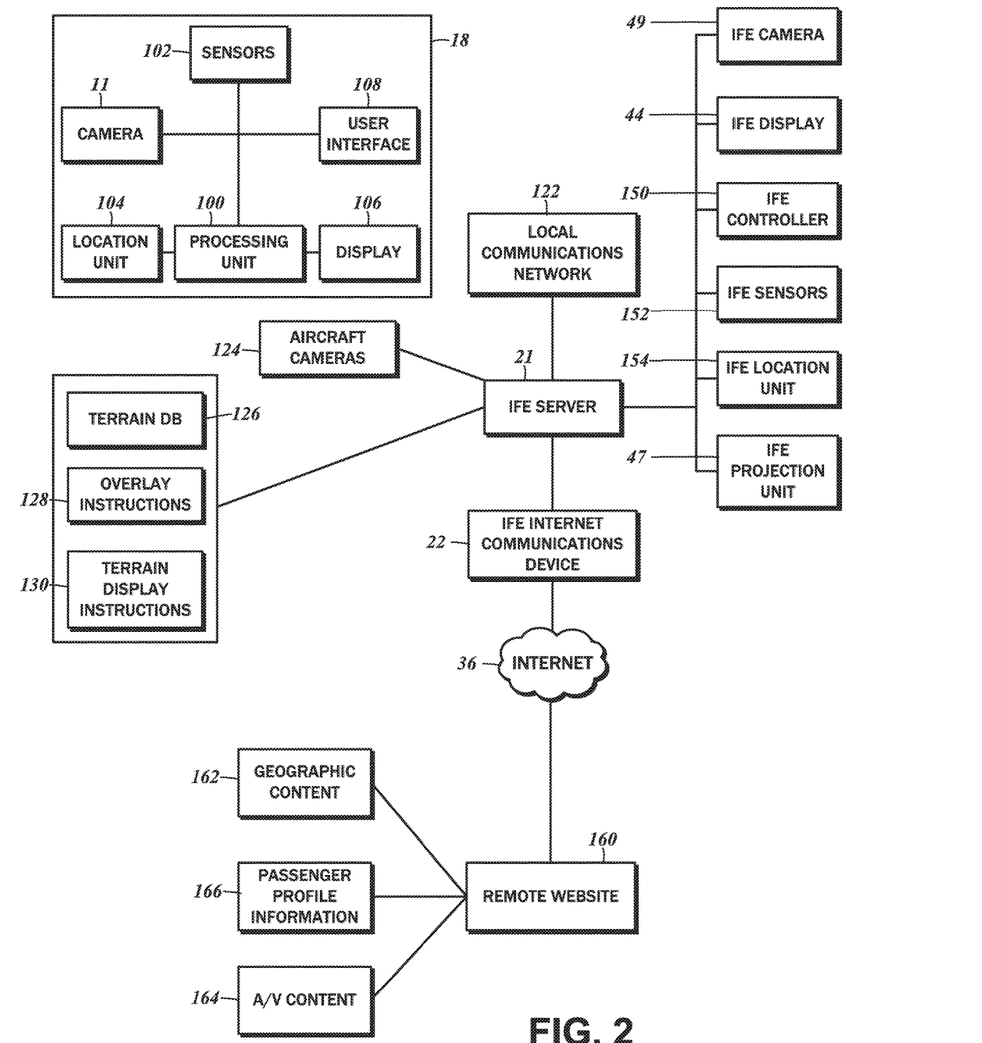
FIG. 2 is block diagram of one embodiment of a system for generating a virtual window display.

A general representation of a method and system for generating imagery of a virtual window, in accordance with the present invention is further shown in FIG. 2. As shown therein, PED 18 is in communication with an IFE server 21, which may generally correspond to the IFE system 20, but may be a standalone server computer system that is operative to access various resources of the IFE system 20, such as the data communications module/IFE internet communication devices 22. Again, the PED 18 may be a general-purpose computing device such as smart phones, tablets, laptops, etc., and includes at least one processing unit 100 and executes pre-programmed instructions to generate various outputs. The processing unit 100 accepts inputs from different peripheral devices, including the aforementioned camera 11, various motion sensors 102, as well as a location unit 104 that reports GPS or other geolocation data. The captured data will be used according to various embodiments of the present invention as will be described in further detail below. The results of the data processing may be presented to the user on the display 106. The PED 18 may incorporate a user interface module 108 that accepts user inputs, and generates corresponding graphics that correspond to the results of the processing operations for presentation on the display 106.

Figure 3:
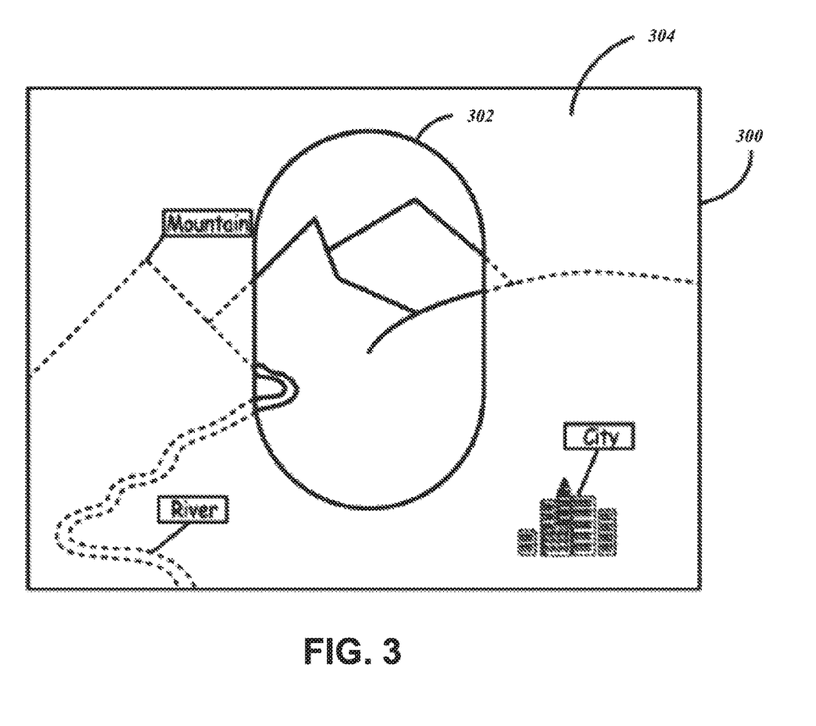
FIG. 3 is an illustration of a display, on a display surface, according to one embodiment.

Once the PED 18 is in communication with the IFE server 21 over a local communications network 122 (which may be the wired local area network 52, or the onboard wireless LAN network) and authorized to utilize those resources, the application running in PED 18 may use resources such as Google Earth™ or Google Sky™ to generate a virtual window for display to the passenger. The virtual window may take the form of a display, as shown at FIG. 3, including an image frame 300, a virtual window frame 302 and an image 304, disposed within the window frame 302. As also shown at FIG. 2, imagery may also be obtained from other resources, such as aircraft cameras 124 that are orientated and arranged to capture images of an environment outside of the aircraft, and images stored in a terrain database memory 126 accessible by the IFE server 21. The way in which the captured images are presented to the viewer may be stored as overlay instructions 128. Along these lines, the specific manner in which the stored images in the terrain database memory 126 are presented to the viewer may be designated by terrain display instructions 130.

The IFE system 20, in addition to the IFE server 21 mentioned above, may have data sources specific thereto that may be presented to the user. By way of example, there may be IFE-specific content 150, which may be various iconic images, landmarks, scenery, or other images, as well as information presented about the terrain, such as an arrow or line leading from a landmark with identifying information (see FIG. 3). The IFE system 20 may include an IFE sensor 152, as well as an IFE location unit 154. Although one purpose of the IFE camera 49 is to capture the passenger's face to detect mood as described in further detail below, the images captured therewith may also be shown along with other images/content. Whatever imagery is ultimately accessed by the PED 18 may be communicated thereto for display on the PED display 106. Alternatively, or additionally, the accessed images may be displayed on an IFE seatback display 44 and/or projected onto an aircraft interior surface by the IFE projection unit 47.

The data communications module/IFE Internet communications device 22 may also connect to a remote website 160 over the Internet 36 to retrieve imagery and other data that may be utilized for customizing the display presentation to the passenger. For example, the remote website 160 may provide a gateway to geographic content 162, which may be substantially the same as the aforementioned terrain database 126. Additional audio visual content 164 may be retrievable from the remote website 160 as well. Passenger profile information 166 that pertain to preferences, flight destinations, usage data, and so forth may be stored by the remote website 160, so that again, the display presentation to the passenger may be customized.

In some embodiments, the imagery may be edited in various respects. In one implementation the PED 18 may implement a series of programed instructions to monitor a passenger's mood, and to edit the selection or display of imagery in accordance with the sensed mood. Mood sensing can be effected via a camera 11 on the PED 18 and/or cameras aimed at an area where a passenger's head would normally appear, and more particularly, where the passenger's facial features can be detected. Other sensing functions can include biometric or environmental sensors that might sense a passenger's temperature, activity level, tone of voice, etc. As indicated above, the selection or editing of the displayed imagery may be implemented in response to the sensed mood or other passenger or environmental conditions.

In order to provide intuitive interactivity for the virtual window display system, an apparatus may be provided to monitor the activity and condition of the passenger and the environment about the passenger in order to allow editing of the imagery. As shown in FIGS. 1 and 2, PED 18 may include a small camera 11 disposed on a PED 18 or otherwise within the aircraft at a location and orientation such that its optics are directed to an area that typically coincides with a head of the passenger, and specifically the face of the passenger, such as the seatback of the seat on which the passenger is sitting, such as a rear-facing, IFE camera 49. Using such cameras 11, 49 together with a suitable control algorithm, the PED 18 may detect the mood or other condition of the passenger. Such information may then be communicated to the PED for analysis in accordance with mood sensing systems, such as facial analysis systems.

Figure 4:
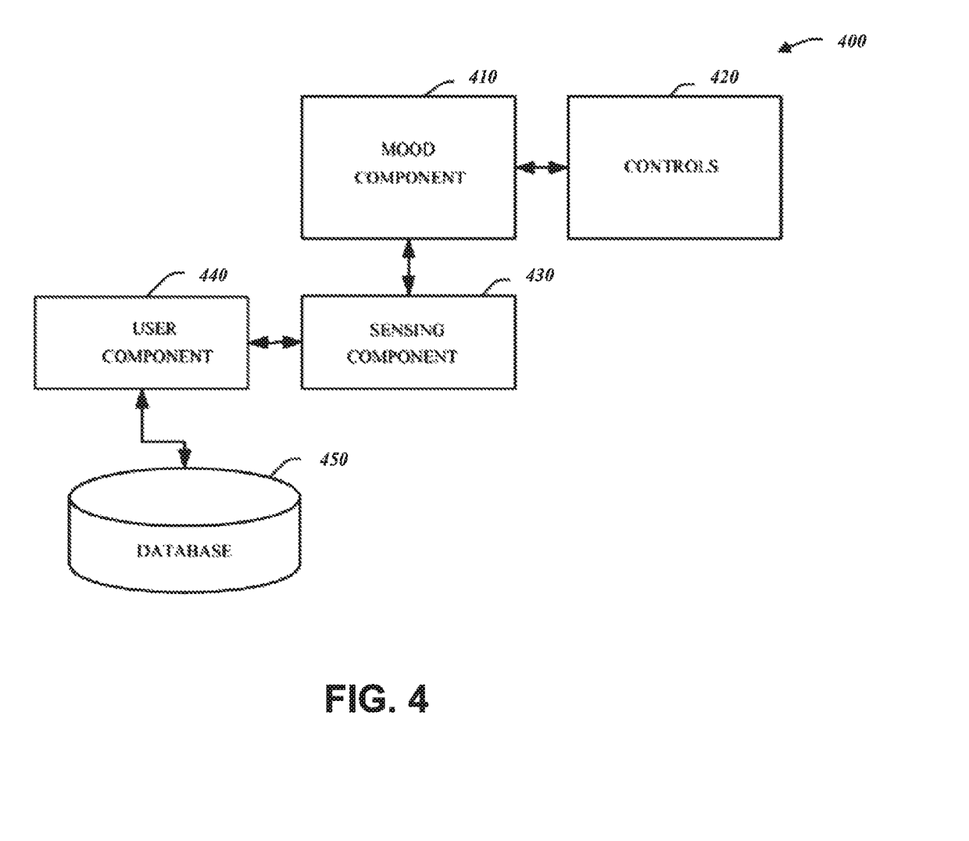
FIG. 4 is an example of a system for sensing a passenger's mood.
Figure 5:
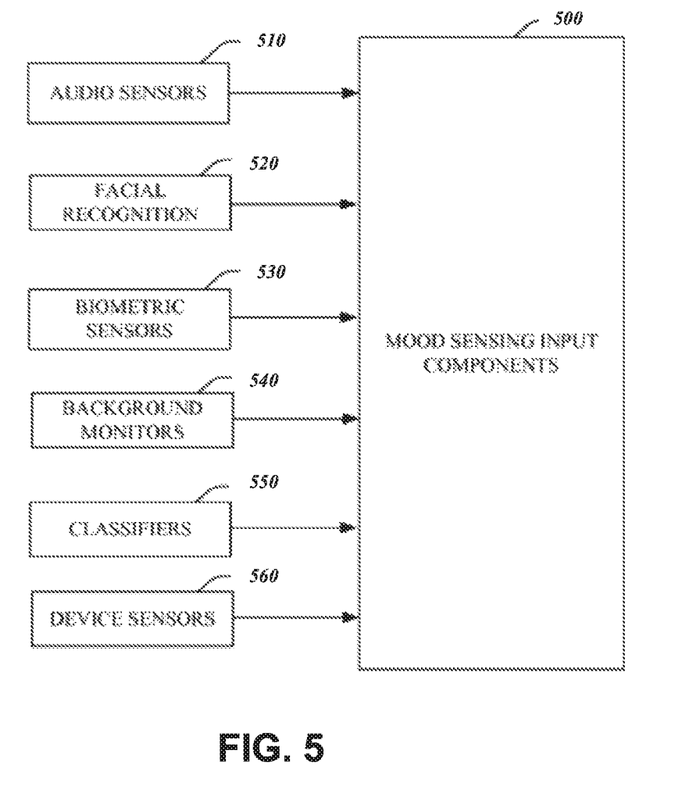
FIG. 5 is a block diagram illustrating multiple inputs to a mood sensing system.

Mood sensing systems 400, as shown at FIGS. 4 and 5, are known in the art, and function to allow emotions and other conditions or feelings to be dynamically detected. In accordance with the present invention, that information may be employed to select and/or edit content displayed on the virtual window. Passenger activity can be sensed, such as whether or how fast the passenger is working, how easily the passenger is distracted, the loudness of a passenger's voice, the type of words that are chosen and so forth. Such activity sensing may be useful to augment mood sensing, by providing a determined context. Biometric sensors such as temperature sensors, electronic sensors, perspiration detectors, facial recognizers, acoustic sensors, may also be implemented using applications running on the PED to monitor various aspects of a passenger's condition.

Upon sensing one or more user activity and/or biological conditions of the user, mood sensing logic 430 may be used to determine the mood of the user, in view of the sensed information. For example, if rapid eye twitches are detected along with a raised voice, the mood sensing logic 410 may determine the user is agitated. Based on the mood, one or more aspects of the imagery in the virtual window, and/or accompanying audio, can be dynamically adjusted by an image selection/edit control 420.

More sophisticated embodiments can use condition/mood information to alter user interfaces, adjust output controls to softer or louder depending on mood, control different music selections, change backgrounds, change lighting, change music selections, or provide coaching tips to cause a change in moods. These determinations may rely upon previously stored information about the user, e.g., passenger profile information 440. This data may be stored in a database 450.

For example, the mood information can be processed to determine that the user is in a mellow mood where the selected imagery can be adjusted to reflect such mood. If light pastel colors were determined to coincide with a mellow mood, such colors could be employed in the display. Background screens and sounds could also be changed to reflect the mellow mood.

In another aspect, shown in FIG. 5, a mood determination module 500 may evaluate the mood of the user based upon an aggregate of multiple factors or data points. One possible factor or input includes audio, as provided via audio sensors 510. According to various embodiments, the audio sensors 510 may be microphones, piezoelectric transducers, and so forth, which may be utilized to capture sounds that are being heard by the user, such as music, the audio track of in-flight entertainment programming, and so forth. Typically, the ambient sounds surrounding a passenger mid-flight will be comprised mostly of engine noise, along with light or moderate voice levels, so the communicating audio that is directly being provided to the passenger may be more determinative of mood rather than ambient sounds.

According to another embodiment, facial recognition sensors 520 can be employed. This can include analyzing facial expressions captured by the PED 18, and/or the IFE camera 49, and compared to local or remote data resources, such as a remote website accessible via the data communications module/IFE Internet communications device 22. Facial recognition components are computer-driven applications for automatically identifying or verifying a person from a digital still or video image. It does so by comparing selected facial features in the live image and a facial database. Such features as a smile can be used to determine happiness whereas a detected frown can be utilized to detect sadness or anger for example. Popular recognition algorithms include eigenface, fisherface, the Hidden Markov model, and neuronal motivated dynamic link matching. Three dimensional face recognition technologies can be employed.

One or more biometrics sensors 530 can be employed for mood sensing. A biometric system is essentially a pattern recognition system which recognizes a user by determining the authenticity of a specific physiological or behavioral characteristic possessed by the user. In regard to mood, mood algorithms receive data from the various sensors and/or other resources and determine a given mood from the various inputs. The biometrics sensors 530 can take on many forms such as perspiration sensors, breathing detectors, and so forth. Substantially any device that can monitor human physical feedback can be employed to help determine a potential mood. Mood information may be used to adjust output audio controls to softer or louder depending on mood, control difference music selections, change backgrounds, or provide coaching tips to cause a change in moods.

User interactions with the PED 18 and/or the IFE system 20 may be analyzed by background monitors 540. Data such as the speed of sequences of inputs (fast typing, slow and methodical scrolling of a document, etc.) may be captured by the background monitors 540 as a further evaluation point indicative of mood. The mood determination module 500 may also utilize classifiers 550, which can detect moods over time by analyzing the aggregate data from the aforementioned inputs, and drawing correlations to moods using historical data. The physical sensors 560 onboard the PED 18 such as the gyroscope and multi-axis accelerometers may be utilized as yet another data point for mood determination.

The PED 18 also has installed thereon a connectivity application programming interface that may be called by the client application in an attempt to establish a connection to the Internet 36, and specifically to the remote application server 38. Once the PED is connected to the Internet 36, it may also seek passenger profile information for use in selecting or editing imagery to be displayed to the passenger. This includes such information as the airline on which the user of the PED 18 is currently flying, the flight number of the flight on which the user of the PED 18 is currently flying, the destination of such flight, the origin/departure point of such flight, the anticipated arrival time of such flight, and the departure time of such flight.

Passenger profile information may also include the home city, country, area code of the passenger. Additionally, the passenger profile also may include frequent flier status/category, connecting flights, and ticket reservations. The passenger's past interactions 69 with particular inflight services on current or past flights may be captured and maintained in the passenger profile. The level of detail of the passenger profile data depends on the specific needs of the airline, and may be varied. The passenger profile information may be received by manual input to the PED 18.

PED 18 also includes a user interface. The user interface allows a user to interface with the PED processing unit to control what is displayed on display. In certain embodiments, PED 18 is a mobile device such as a tablet computer, a cellular phone, and the like. When the PED 18 is a tablet computer, the PED user interface interacts with the user via a touchscreen, a keyboard, a mouse, a microphone, or the like. Also, in some embodiments, the PED 18 contains an internal location unit. PED 18 may also include an internal GPS and attitude sensor, where the attitude sensor includes at least one gyroscope and at least one accelerometer. The PED location unit may determine the location of the aircraft in relation to the Earth. In some implementations, the location unit can detect the position, attitude, and heading of the aircraft. For example, the location unit may include a navigation unit such as a GPS and an Inertial Measurement Unit. When the location unit determines the location of the aircraft, PED 18 processes the location information and can access a third party website, such as Google Earth™, to import location associated geographic information respecting adjacent terrain features, points of interest, etc., to display a virtual view of the terrain on a display surface viewable by the passenger, such as a PED display or an IFE display.

The PED processing unit 100 may include at least one electronic device that accepts data and performs mathematical and logical operations. The processing unit 100 includes functions with software programs, firmware, or other computer readable instructions for carrying out various methods, process tasks, calculations, and control functions used in implementing the functionality described herein. These instructions may be stored on the PED or any appropriate computer or machine readable medium in communication with the PED used for storage of computer readable instructions or data structures, such as a PED memory or cloud memory.

The PED memory typically includes at least one device that can hold data in a machine readable medium. The computer read-able medium is accessed by a general purpose or special purpose computer or processor, or other programmable logic device. Suitable computer or processor readable media includes storage/memory media such as magnetic or optical media. For example, storage/memory media includes conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EE-PROM), and flash memory, etc. Suitable processor-readable media also includes transmission media such as electrical, electromagnetic, or digital signals, conveyed via a communication medium such as a network and/or a wireless link. The computer-readable medium together with instructions embodied thereon may comprise a program product or application program.

The PED memory may also store a terrain database. The phrase "terrain database," as used herein, refers to a database that stores information describing the terrain through which an aircraft is traveling. For example, the terrain database may store information that describes the terrain of the Earth. In one implementation, terrain database includes satellite imagery of the world. Alternatively, the terrain database includes a digital representation of the Earth's terrain like a digital elevation model, a digital terrain model, a vertical obstruction database, and the like. Further, the terrain database may store descriptive information that identifies and describes features that are recognizable when the terrain represented by the terrain database is shown on a display device. Descriptive information describes landmarks, points of interest, geographical features, and the like. For example, descriptive information describes the location of mountains, historical sites, rivers, canyons, cities, political borders, roads, and the like. Also, the terrain database can include a weather database that stored weather information associated with a particular terrain. The terrain database can reside on the PED memory or on a memory located away from the PED 18. When the terrain database is stored in a memory located remote from the PED 18, the PED 18 processing unit acquires the information stored in remote terrain database 110 by communicating through a wireless network or other form of communication.

The PED processing unit 100 can use the altitude, position, heading, and attitude to produce displayable imagery representing the view of the Earth's terrain from the aircraft. The phrase "displayable information", as used herein, refers to machine readable information that directs a display device to render a recognizable image. The PED processing unit transmits the displayable information to selected display devices described above. Upon reception of the displayable information, the selected display device displays an image to a viewer. For example, when the PED processing unit transmits information associated with the external environment of the aircraft to the IFE seatback display 44, it can render the displayable information as a virtual view of the external environment from a location within the aircraft. In some implementations, the selected display device can render the displayable information as a three dimensional view of the external environment. Alternatively, the selected display device renders the displayable information as a two dimensional view of the external environment.

In a further implementation, PED memory and/or IFE memory can store overlay instructions. The phrase "overlay instructions", as used herein, refers to computer instructions stored in a memory that direct a processing unit to alter the displayable information associated with a view of the external environment by including overlay information on the displayed imagery.

For purposes of the present invention, the selected and/or edited imagery may be displayed on any device capable of rendering a visual display. As presently determined, the display device may be at least one of the IFE projection unit 47 directed to an aircraft interior surface, the IFE seatback display 44, a PED display or the like. Further, the display device may include a single display or multiple displays. For instance, in an airplane, the display device may project a single display on the bulkhead of the cabin for viewing by all of the passengers in the aircraft. The single display may provide a single constant view of an environment outside of the aircraft, or a display that periodically changes the depicted view to represent different views from the same or different locations from within the aircraft.

Passenger profile information may also be used to facilitate the selection and/or editing of imagery displayed within the display window. For example, if the passenger has identified an interest in water sports, and the aircraft is traveling to Hawaii, the imagery may include imagery of beaches and other water sports activities in Hawaii.

Figure 6A:
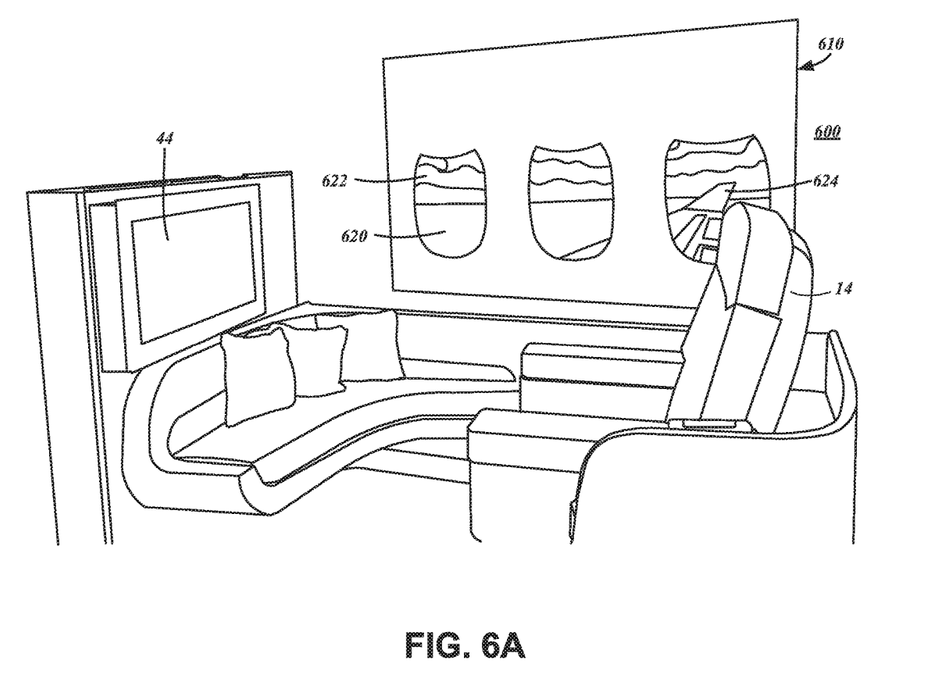
FIG. 6A is an illustrative example of the present system and method for generating a virtual window display in operation.

FIG. 6 illustrates another embodiment of the present invention in which the view of the visual display is limited to one passenger or seat. Projected onto the side wall 600 of the aircraft 10 is the virtual window 610 that is viewed by the passenger sitting in the seat 14. Although the example shows the virtual window 610 being projected on to the sidewall 600, it is also possible to project similar images onto any other suitable surface such as a tray table. As indicated above, various information may be gathered from third party resources and customer resources to assemble a realistic, though artificial computer-generated imagery. In the illustrated example, a "window" that mimics a conventional physical window on aircraft may be presented, where a simulated outside view is framed within such window. It will be appreciated by those having ordinary skill in the art that any suitable frame may be readily substituted, such as square house windows and the like. Indeed, the frame is understood to be entirely optional.

Figure 6B:
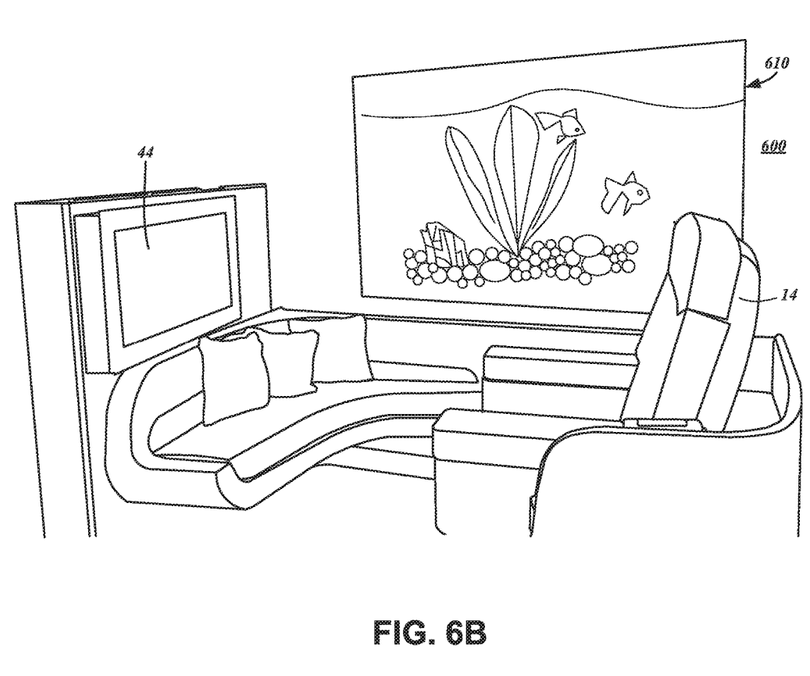
FIG. 6B is another example of the virtual window display showing an alternative image.

Preferably, though optionally, the content of the virtual window 600 may be the current terrain 620 outside the aircraft 10. Other content may be an aquarium such as that shown in FIG. 6B, or any other calming scene that may aid in reducing anxiety. Returning to FIG. 6A. The virtual representation of the current terrain 620 may be further enhanced with representations of current weather conditions, with visuals of clouds 622 being overlaid on the terrain 620. The weather data may be obtained in real-time from the application server 38. Alternatively, the weather overlays may be removed from view at the selection of the passenger if so desired. Furthermore, the view through the virtual window 600 may be modified to suit the time of day, or to arbitrarily switch to a night, day, dusk, or any other desirable time. For instance, if the current time at the destination is in the evening, the scenery may be changed to that of an evening view, notwithstanding the time at the current flight location being the morning. As shown in the example of FIG. 6A, wings 624 and other exterior aircraft components may also be presented/reproduced within the virtual window 600 to provide a more realistic perspective for someone looking at the virtual window.

Other types of overlays are also contemplated, such as points of interest indicators on corresponding locations on the representation of the current terrain 620. According to various embodiments, such point of interest indicators can be selected through gestures, through touch inputs imagery received via the PED 18, and so forth. The overlays may be generated within the virtual window 610, on an alternative surface as described above, on the IFE display 44, or the PED 18. With its various input capabilities, motion input applied to the PED 18 may be used to navigate the terrain 620. For example, by moving the PED 18 laterally, the virtual window 610 may be panned; by tilting the PED 18, the view may be rotated. Those having ordinary skill in the art will recognize the possible correlations between the physical input applied to the PED 18 and the corresponding change in the virtual window 610 that is the most intuitive and user-friendly. In addition to viewing existing point of interest indicators, the passenger may add further point of interest indicators and supplemental information that may be shared with subsequent passengers. Beyond visual content, it may be possible to present audio content as the passenger views the virtual window 600.

According to another aspect of the present invention, the view/perspective of the virtual window 600 may be modified in accordance with the detected orientation of the passenger's head or face. Captured orientation data may be used to distort or otherwise alter the virtual window 600 to simulate changes in perspective, thereby providing a more realistic experience. For example, the passenger raising his/her head while rotating the head down may correspond to a "peering over" action, which results in previously hidden portions of the terrain 620 being shown, with slight distortion. Although minimal changes in the view of the terrain 620 may be necessary in respond to the passenger moves his/her head, closer objects such as the representation of the wing 624 may involve more substantial display changes.

The particulars shown herein are by way of example only for purposes of illustrative discussion, and are presented in the cause of providing what is believed to be the most useful and readily understood description of the principles and conceptual aspects of the various embodiments of the system for dynamically implementing firewall exceptions set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for generating a display of imagery of a virtual window within an aircraft cabin, using a personal entertainment device (PED) configured to interface with an aircraft onboard inflight entertainment (IFE) system and to direct the selection of imagery in response to a biological condition of a passenger using the PED, the system comprising:
    a PED configured for wireless communication with the IFE system, the IFE system including an internet communicable device and with at least one camera disposed to capture live imagery of an environment outside of the aircraft and a terrain database of virtual imagery corresponding to the environment outside of the aircraft;
    computer executable instructions stored on the PED for configuring the PED to:
        receiving passenger profile information into the PED;
        linking the PED to the IFE system on the aircraft;
        accessing imagery from the at least one camera and the terrain database through the IFE;
        sensing a condition of the passenger;
        deriving user mood information based upon the sensed condition of the passenger;
        editing the accessed imagery in response to the derived mood information to produce edited imagery; and
        presenting the edited imagery on a display surface visible to the passenger, the edited imagery being formatted to simulate an aircraft window, with the edited imagery from the live imagery being presented according to overlay instructions, and the edited imagery from the virtual imagery being presented according to terrain display instructions.

2. The system as recited in claim 1 wherein the computer executable instructions further configure the PED for displaying the edited imagery on a display surface on the PED.

3. The system as recited in claim 1 wherein the computer executable instructions further configure the PED for communicating the edited imagery to the IFE, for display on an IFE display surface disposed proximate the passenger.

4. The system as recited in claim 1 wherein the computer executable instructions further configures the PED for selectively accessing audio data from one of the IFE and a third party website accessible by the internet communicable device.

5. The system as recited in claim 4 wherein the computer executable instructions further configure the PED for communicating the audio data to the passenger along with the edited imagery.

6. The system as recited in claim 4 wherein the computer executable instructions further configures the PED for selecting the audio data in response to the passenger profile information.

7. The system as recited in claim 4 wherein the computer executable instructions further configures the PED for selecting the audio data in response to the sensed mood information.

8. The system as recited in claim 7 wherein the computer executable instructions further configures the PED to output the audio data at an edited volume.

9. The system as recited in claim 1 further comprising an image projector in communication with the PED, for projecting the edited imagery on an aircraft interior surface located proximate the passenger.

10. The system as recited in claim 1 wherein the edited imagery includes a frame substantially circumscribing the edited imagery, the frame being representative of an aircraft window frame.

11. The system as recited in claim 1 wherein the editing the imagery includes modifying at least one of the image brightness and image coloring.

12. The system as recited in claim 1 wherein the computer executable instructions further configure the PED for generating location information using resources within the PED; accessing geographical feature information, corresponding to the location information, from a third party website accessible through the internet communicable device; and displaying the accessed geographical feature information on the display surface.

13. The system as recited in claim 1 wherein the establishing the link between the PED and the IFE comprises polling the IFE using a series of communication protocols to identify a specific communication protocol used by the IFE.

14. The system as recited in claim 13 wherein the establishing the link between the PED to the IFE further includes the steps of identifying IFE configuration requirements based on the specific communications protocol used by the IFE and configuring the PED to facilitate communication between the PED, the IFE, and resources associated with the IFE.

15. The system as recited in claim 1 wherein the sensing the condition of the passenger is implemented using a camera disposed in the PED.

16. The system as recited in claim 1 wherein the sensing the condition of the passenger is implemented using a camera disposed in an aircraft surface proximate the passenger.

17. A method for interactive display of imagery within an aircraft, the method comprising:
    establishing a communications link between a personal electronic device (PED) and an in-flight entertainment (IFE) system on the aircraft with a selected one of the PED and the IFE, the IFE being in wireless communication with a worldwide information network;
    sensing activity and biological condition of the user with sensors connected to the PED;
    deriving, in the IFE user mood information from the sensed activity and biological condition of the user;
    capturing live imagery of an environment outside of the aircraft using at least one camera disposed along an exterior surface of the aircraft;
    accessing, by the IFE, imagery on at least one website accessible on the worldwide information network;
    editing on the PED the accessed imagery and the live imagery based on the derived mood information; and
    displaying, by the IFE, the edited imagery to the user on a display surface within the aircraft, the displayed imagery being formatted to simulate an aircraft window, with the accessed imagery being displayed according to terrain display instructions and the live imagery being displayed according to overlay instructions.

18. The method as recited in claim 17 further comprising loading user profile information onto the PED; wherein the accessed imagery is associated with the user profile information.

19. The method as recited in claim 17 further comprising sensing environmental conditions within the aircraft; wherein the accessed imagery is associated with sensed environmental conditions.

20. The method as recited in claim 18 wherein said loading user profile information into the PED includes receiving the user profile information by user manual entry.

* * * * *